April 6, 1954  O. H. GRISWOLD  2,674,311
MACHINE FOR CUTTING SLUGS AND POSITIONING
THEM ON TRANSFER SHEETS
Filed Sept. 27, 1951  8 Sheets-Sheet 1

Fig.1

INVENTOR.
OWEN H. GRISWOLD
BY
ATTYS

INVENTOR.
OWEN H. GRISWOLD
BY
ATTYS.

Patented Apr. 6, 1954

2,674,311

UNITED STATES PATENT OFFICE 2,674,311

MACHINE FOR CUTTING SLUGS AND POSITIONING THEM ON TRANSFER SHEETS

Owen H. Griswold, Paramus, N. J., assignor to Technical Rubber Company, Johnstown, Ohio, a firm Application September 27, 1951, Serial No. 248,484

19 Claims. (Cl. 164—89)

My invention relates to a machine for cutting slugs and positioning them on transfer sheets. It has to do, more particularly, with a machine which will die-cut or punch slugs from a strip or sheet of heavy tacky rubber stock and will position the slugs in a predetermined order on a transfer sheet or decalcomania sheet which bears trade-marks or other desired data to be transferred to the slugs.

My machine is capable of many uses but I shall describe it as being used for die-cutting from a strip of heavy sticky or tacky uncured rubber stock, slugs or discs which can be used in producing rubber patches for pneumatic tubes. Obviously, it is desirable to apply to each patch a trade-mark or other identifying data and my machine is designed not only to punch out slugs from the rubber stock but also to position them on a transfer sheet, which has a plurality of printed trade-marks thereon, so that each slug is positioned over a trade-mark.

One of the objects of my invention is to provide a machine of the type indicated above which is capable of handling the sticky heavy rubber stock, which obviously because of its sticky nature is difficult to handle, and in fact to provide a machine which utilizes the adhesive quality of the stock to advantage in operating and controlling the machine.

Another object of my invention is to provide a machine of the type indicated which, when set for automatic operation, is completely automatic after the stock and transfer sheet are properly positioned thereon.

Another object of my invention is to provide a machine of the type indicated which is so designed that the particular transfer sheet being used determines the timing of the cutting mechanism and determines the indexing of the slugs on the transfer sheet thereby making the machine adaptable to the punching of different sizes and shapes of slugs and the proper positioning of the slugs on the marks of a transfer sheet provided for a particular size and shape of slug.

Another object of my invention is to provide a machine wherein the strip of stock is in roll form when mounted on the machine and the mechanism for feeding the stock utilizes the adhesive nature of the stock and functions to feed it constantly and uniformly regardless of the circumference of said roll and in such a manner that there will be no sagging, buckling or wrinkling of the strip.

Still another object of my invention is to provide a machine of the type indicated above wherein the cutting mechanism can be changed readily to produce slugs of different sizes and shapes.

A further object of my invention is to provide a machine of the type indicated wherein the mechanism for feeding the stock can be adjusted readily for various sizes and shapes of slugs to be punched.

Another object of my invention is to provide a machine of the type indicated above which will punch the slugs from the strip of stock in such a manner that the most economical use of the stock will result and the scrap material will be kept to a minimum regardless of the size and shape of the particular slugs being formed.

A further object of my invention is to provide a machine wherein the scrap material is saved in the form of a convenient roll for salvage.

Another object of my invention is to provide a machine wherein the die-cutters and associated stripping mechanism are especially designed to handle the sticky stock and slugs without jamming.

According to my invention, I provide a machine which includes an elongated base or table having an endless belt conveyor extending from one end thereof to the other. Intermediate the ends of this table and extending transversely thereof is the slug-forming unit which includes die-cutting mechanism with associated slug-stripping mechanism. The stock is fed by a suitable unit to the slug-forming unit from one side thereof in one direction and the transfer sheet is fed in an opposed direction beneath such unit from the opposite side thereof. The die-cutting mechanism is actuated to punch out or cut the slugs from the stock and the stripping mechanism is then actuated to strip the slugs from the cutting mechanism and position them properly on the transfer sheet, each slug being positioned over a trade-mark or other mark on the sheet.

The particular transfer sheet being used determines the timing of the slug-forming unit and the stock-feeding unit. The trade-marks on the transfer sheet will be arranged in transverse staggered rows and these will correspond with the arrangement of the transverse rows of cooperating dies and anvils of the slug-forming unit. Thus, when the slugs are deposited on the sheet, each will be positioned over a trade-mark. The staggered row arrangement results in highest possible efficiency of the area of the transfer sheet and the area of the stock strip which is punched and the slugs deposited on the transfer sheet all will be equidistant from each other to facilitate subsequent operations of forming patches from the slugs. The timing of the machine is determined by indexing marks on the transfer sheet. The machine can be set for automatic or hand operation.

The preferred embodiment of my invention is illustrated in the accompanying drawings wherein similar characters of reference designate corresponding parts and wherein.

Figure 1:
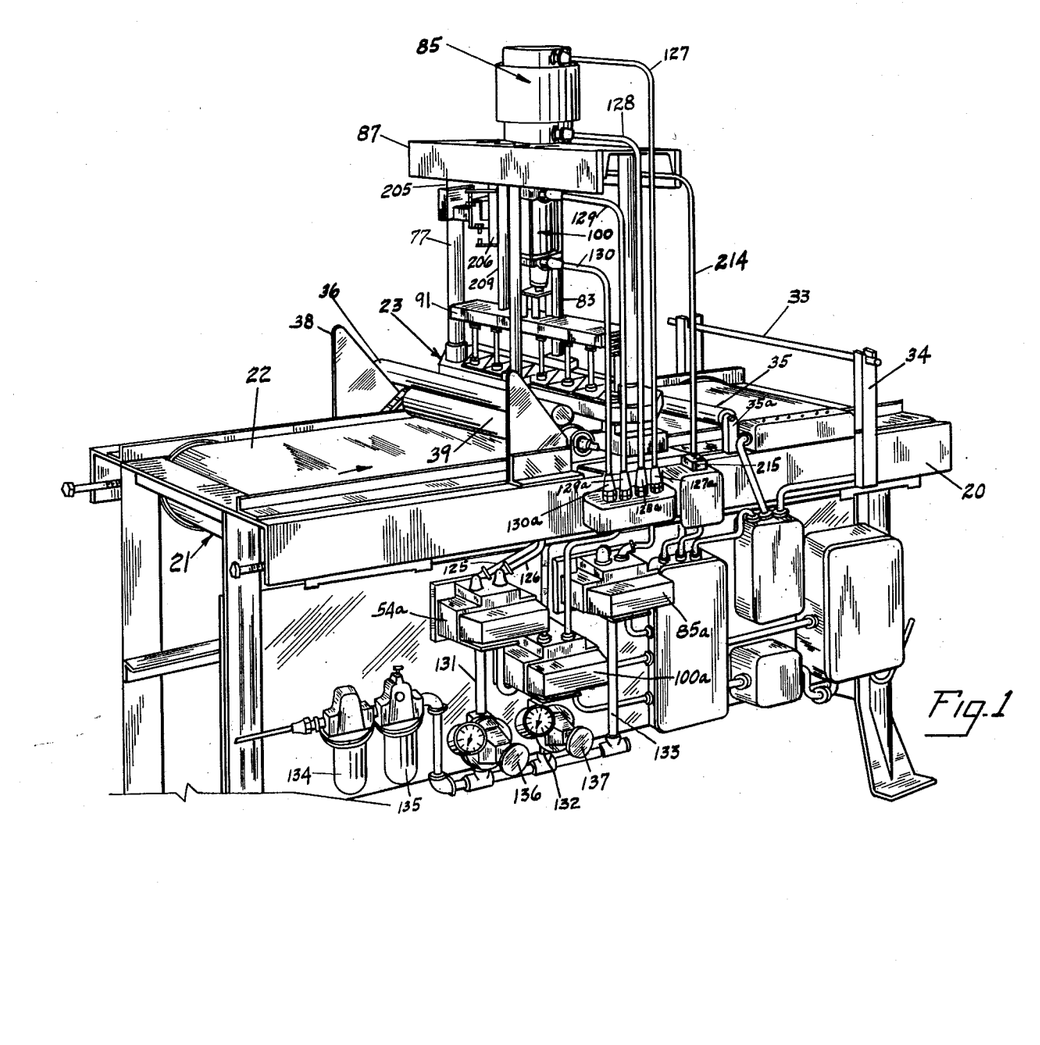
Figure 1 is a perspective view taken at one side of a machine embodying my invention.

With reference to the drawings, in Figure 1, I have illustrated the general arrangement of my machine. This machine includes an elongated base or table 20 having an endless belt conveyor 21 extending from one end thereof to the other. This conveyor 21 includes a belt 22 which is supported in the usual manner (not shown) at the top of table 20 on transverse rolls carried by the table. Intermediate the ends of this table and extending transversely thereof is the slug-forming unit 23 which is disposed perpendicular to the path of movement of the belt. The conveyor belt passes beneath this slug-forming unit 23 towards the right or rear (Figure 1) as indicated by the arrow.

Figures 7, 7A:
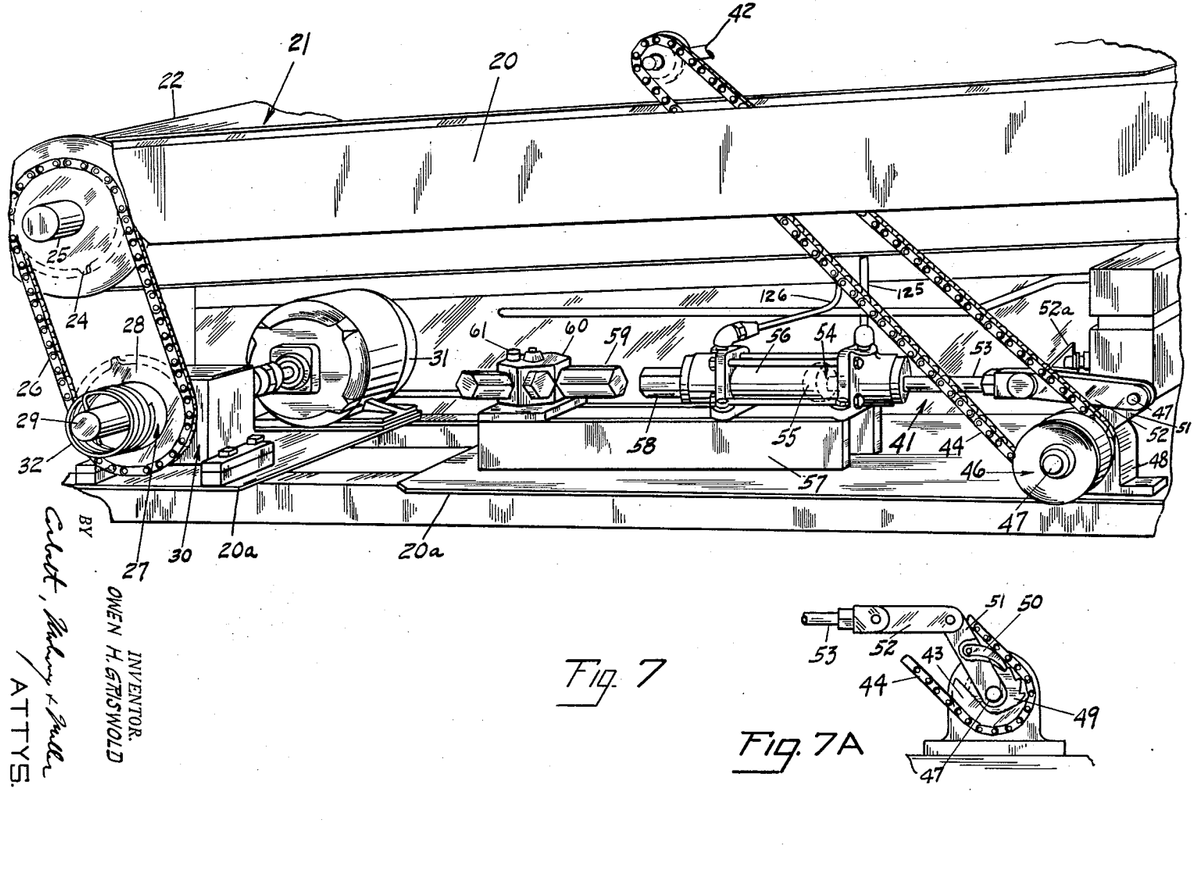
Figure 7 is an enlarged detailed perspective view of the belt driving unit and the stock-feeding unit and associated structure.
Figure 7a is a detail of the overriding clutch forming a part of the stock-feeding unit shown in Figure 7.
Figure 8:
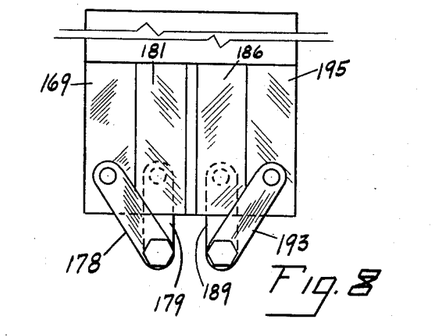
Figure 8 is an enlarged detail in plan showing switch actuating arms associated with the slug-forming unit.

As shown in Figure 7, the conveyor 21 is driven by means of a sprocket 24 which is keyed on the end of a shaft 25 that carries one of the conveyor belt-supporting rolls. This sprocket 24 is driven by an upwardly extending chain 26 through the medium of a yieldable clutch 27 associated with a sprocket 28. The sprocket 28 is continuously driven by means of the output shaft 29 of a gear reduction unit 30 which is coupled to an electric driving motor 31. The motor 31 and gear unit 30 are supported by a shelf 20a spaced below the top of the table 20. The clutch 27 includes a torsion spring 32 which has one end anchored to the shaft 29 and the other end attached to the sprocket 28. The sprocket 28 is rotatably mounted on the shaft 29. Sufficient resistance to movement of the conveyor belt 22 will cause the torsion spring 32 to wind up on the shaft 29, since the shaft will continue to rotate within the now stationary sprocket 28. Thus, the belt 22 is ordinarily driven continuously but can be stopped for a limited period, without disconnecting the drive from the motor 31, by actuation of the yieldable clutch 27.

The stock from which the slugs are to be formed is supported at and fed from the rear or right hand end of the machine, with reference to Figure 1. The stock is in the form of a roll of heavy sticky rubber material, as previously indicated. It is supported on a transverse mandrel or rod 33 which merely rests in notches formed in the upper ends of supporting standards 34 (Figure 1) which extend upwardly from the table 20 at the rear end thereof and are rigidly secured to the sides thereof. Before entering the slug-forming unit 23, the strip of material is passed beneath an idler guide roller 35 which extends transversely of the table and is supported by brackets 35a carried thereby at a level slightly above the upper portion of the belt 22. This strip of stock is passed through the unit 23, as will be explained more in detail later, and after the slugs are formed therefrom, the waste material of the strip is wound on a transversely disposed rod or mandrel 36, as shown best in Figure 2 where the strip is indicated by the letter S. The mandrel 36 has its ends resting on the inclined edges 37 of brackets 38 which are rigidly attached to the upper portion of the table 20 just slightly forward or to the left (Figure 1) of the unit 23, one of these brackets being disposed outside each edge of the conveyor belt 22. The edges 37 are inclined downwardly and rearwardly.

Figure 2:
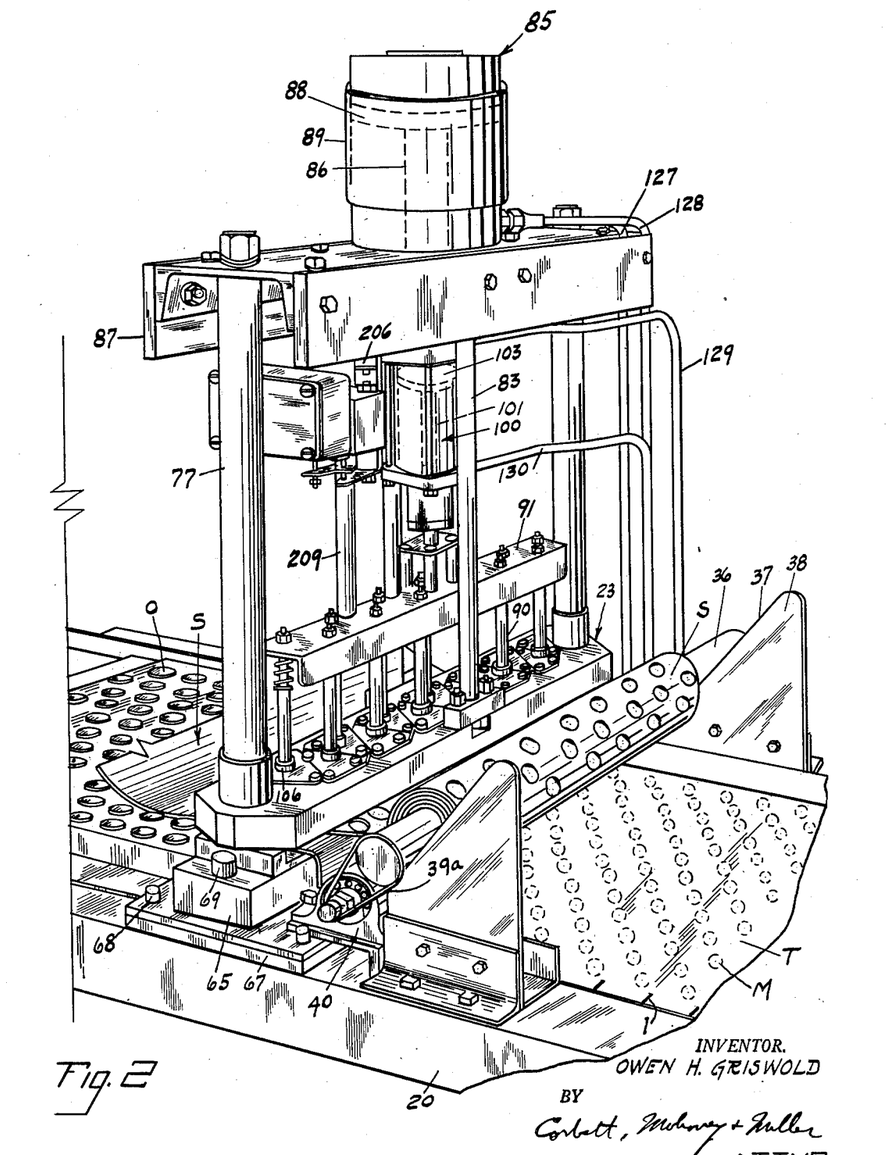
Figure 2 is an enlarged perspective view taken at the other side of the machine showing the slug-forming unit of the machine.

Between the brackets 38 and the lower portion of the unit 23, a transversely extending driven feed roll 39 (Figure 1) is provided. This feed roll is rotatably carried by bearings 40 disposed at opposite sides of the table just behind brackets 38 and one of which is illustrated in Figure 2. Thus, the roll of waste material which is wound on the rod 36 is always in contact with the feed roll 39 regardless of the size of the roll of waste material. It will be understood that the weight of the roll of waste material holds it against the feed roll 39 since the rod 36 is free to slide down the inclined edges 37 of brackets 38. Thus, the sticky nature of the stock is used to advantage in feeding the strip S of material. The feed roll 39 will positively drive the roll of waste material, due to the sticky nature of the material. Whenever the roll 39 is driven, the strip of stock S will be pulled through the slug-forming unit constantly and uniformly, it being obvious that the strip will be under tension so that there will be no danger of the strip sagging, buckling or wrinkling. The feed will be constant and uniform during the periods of rotation of the roll 39, regardless of the size of the roll of stock supported by bar 33, which roll is being unwound, and regardless of the size of the roll of waste material which is being wound on the rod 36. Rubber shock cords 39a (indicated at one side in Figure 2) may be passed around each end of the mandrel 36 to aid in holding the waste roll down against driving rolls 39 especially when the waste roll is light at the starting of a new roll.

The roll 39 is driven only at proper intervals by means of the stock-feeding unit 41 which is shown in detail in Figures 7 and 7a. That end of the shaft 42 shown in Figures 2 and 7 which supports the roll 39, is provided with a drive sprocket 43 which is driven by means of a chain 44. This chain 44 passes downwardly and around the sprocket 45 of an overriding clutch 46 which is carried by a transverse shaft 47. This shaft 47 is mounted in bearings 48 (one of which is shown) mounted on the shelf 20a below the top of the table. The clutch 46 may take various forms but is shown as including a ratchet wheel 49 (Figure 7a) which is keyed to the shaft 47. This wheel 49 is engaged by a pawl 50 which is pivoted intermediate an arm 51 that is mounted on shaft 47 for swinging movement. The upper end of arm 51 is pivoted to the outer end of a longitudinally extending link 52 which is disposed for reciprocating movement above the ratchet wheel. The inner end of this link 52 is pivoted to the outer end of a piston rod 53 of a longitudinally disposed cylinder and piston unit 54. Outward movement of the piston rod 53 causes the pawl 50 to engage the ratchet wheel 49 and rotate it in a counterclockwise direction. Return movement of the piston rod obviously does not rotate the ratchet wheel. When the ratchet wheel 49 moves in a clockwise direction (Figure 7) it rotates the feed roll 39 in a similar direction through the sprocket and chain drive. The feed roll 39, therefore, drives the roll of waste material in a counterclockwise direction and causes the material to continue to roll up thereon and pulls the stock through the slug-forming unit 23. Thus, the unit 41 serves to feed the stock through the unit 23 at proper intervals.

In order to accurately determine the amount of stock fed into the unit 23, the adjustable stop arrangement shown in Figure 7 is provided. The piston rod 53 is attached to a piston 55 which reciprocates in a cylinder 56. This cylinder 56 is carried by supports 57 rigidly secured to the shelf 20a. The cylinder and piston unit 54 is of the double-acting type and a piston rod 53 extends from the opposite end of the cylinder. This rod 58, on the return movement of piston 55 will engage a stop pin 59 extending radially from a stop turret 60. This turret 60 will carry radially extending angularly spaced pins of different lengths and it can be rotated to position any of them in axial alignment with the rod 58. The turret 60 is supported for rotation on the supports 57 and may be fixed in any position to which it is rotated by means of a removable locking pin 61. Thus, it will be apparent that the extent of the return movement of the rod 58 is limited by the stop pin 59. This movement can be adjusted readily by rotating the turret 60 to move any selected stop pin 59 in position to be engaged by the rod 58. Limiting the extent of the return movement of the rod 58, obviously, will limit the extent of the feeding movement of the rod 53 and, therefore, will determine the amount of rotation imparted to the feed roll 39.

The slug-forming unit 23 is illustrated best in Figures 1, 2, 3 and 4. As previously indicated, this unit comprises a stationary cutter and a movable cutter or anvil between which the strip of stock S is fed. Because of the sticky nature of the stock, I use a compression type cutting mechanism. This mechanism includes the lower stationary cutter which is in the form of a transversely extending cutter die carrying block 65 over which the strip of stock S passes. Above this die block 65 is the transversely extending anvil-carrying block 66 which is disposed above the strip of stock S and is movable downwardly into contact therewith. The cutter block 65 is of heavy construction and rests on the leveling or gauge plates 67 secured to each side of the table by bolts 68. The block 65 supports all of the stock-forming unit 23 and is rigidly bolted in position on the table by means of a bolt 69 at each end of the block which passes downwardly therethrough and through the plates 67 into the main frame of the table.

Figure 13:
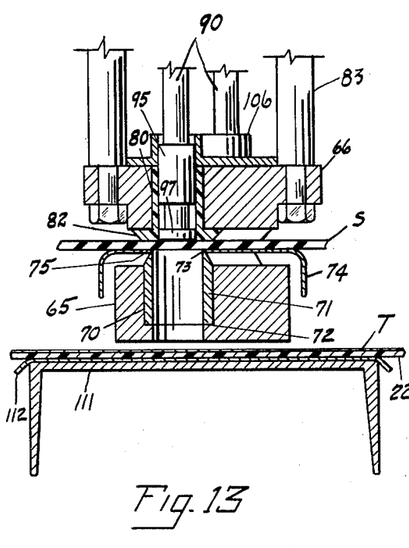
Figures 13 to 16 are enlarged detailed views, mainly in vertical section, showing successive positions of the cutting anvils and the stripping plungers during the operating cycle of the machine.

The stationary die block 65 is provided with two rows of sockets for receiving cutter dies, the sockets of one row being staggered relative to those of the other so that maximum use of the area of the strip of stock S and the area of the transfer sheet T will result, as will be clear later. The sockets are shown best in Figures 4 and 13 to 16 where they are indicated by the numeral 70. Each socket 70 receives a tubular cutter die 71. The lower edge of the die 71 rests on a shoulder 72 in the socket. The upper edge 73 of the die projects upwardly above the block 65 and is sharp. Mounted above the block 65 is a stripping hood 74 which extends downwardly over the forward and rear edges of the block. This hood 74 is of sheet metal and is provided with properly located openings 75 up into which the cutting dies 71 just project when the hood is in its uppermost position (Figure 13). The hood 74 is suspended from anvil block 66 by means of a pair of bolt and spacer units 76 (Figure 3) at each end thereof so as to provide a fixed space or throat through which strip S passes. When the hood 74 is in its lowermost position (Figure 15) dies 71 project upwardly therethrough a substantial distance. The return or upward stroke of block 66 will lift the hood 74 and, therefore, will lift the strip S off the upper ends of the dies 71 (Figure 16).

As previously indicated, the block 65 supports all portions of the unit 23. Therefore, this block 65 carries a pair of upstanding standards or posts 77, one of which is disposed at each end of the block and the lower ends of which are fixed in sockets 78 formed in the ends of the block, as shown best in Figure 3. Above sockets 78 stop collars 78a are clamped against block 65. Mounted for sliding vertical movement on these posts 77 is the movable cutter or anvil block 66. It will be noted from Figure 3 that each end of the block 66 is provided with a tubular guide bushing 79 through which the post 77 passes. Thus, the block 66 can slide vertically on the posts 77. Contact of bushings 79 with collars 78a determines accurately the lowermost position of anvil block 66.

The anvil block 66 is illustrated best in Figures 3, 4 and 13 to 16. This block is provided with a double row of sockets 80 which are arranged in the same manner as the cutter die receiving sockets 70 in the block 65. Each socket 80 receives an anvil member 81 which may be of tubular form as shown. Each anvil member has a flange 82 on its lower edge for cooperating with the sharp upper edge 73 of the adjacent cutting die 71. The flange 82 not only serves as a flat anvil surface for cooperating with the associated cutter edge but also prevents upward movement of the anvil member 81 through the socket during the cutting action.

Figure 3:
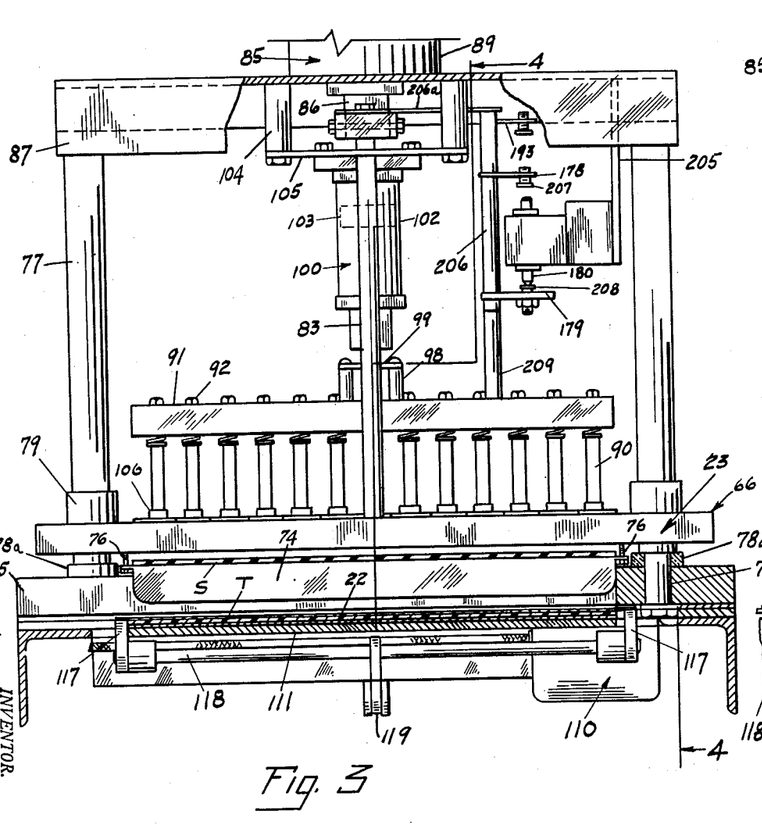
Figure 3 is a transverse sectional view through the machine, taken at the side of the slug-forming unit where the stock is fed.
Figure 4:
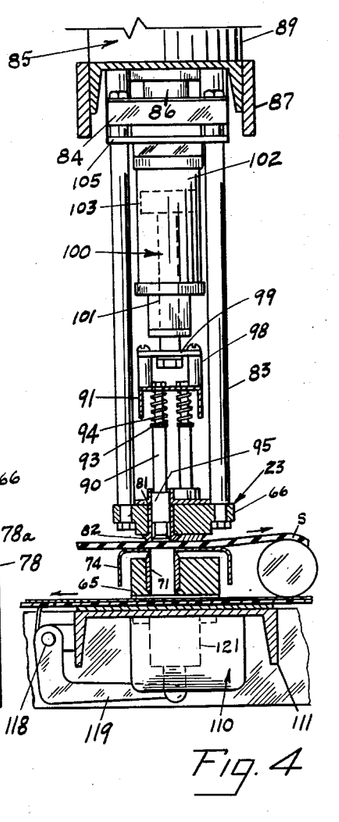
Figure 4 is a sectional view taken along line 4—4 of Figure 3.

Midway between its ends, the anvil block 66 has rigidly attached to it, the lower ends of forward and rearward actuating rods 83. The upper ends of these rods 83, as shown best in Figures 3 and 4, are rigidly connected to a bracket 84 which is rigidly attached to the lower end of a piston rod 86 of the cylinder and piston unit 85. The cylinder 89 of the unit 85 is supported by means of an inverted channel support 87 which extends transversely of the machine and is rigidly carried on the upper ends of the posts 77. When the piston 88 of the unit 85 is moved vertically in the cylinder 89 thereof, the anvil block member 66 is moved vertically. If the strip of stock S is in the position between the anvil block 66 and the die block 65 and the piston 88 is moved downwardly, the anvil surfaces 75 will press the stock against the cutting edges 73 and will form the slugs from the stock. Hood 74 will be moved upwardly upon upward movement of block 66 and this will strip the edges of the openings in the stock S from the cutting edges 73 of the cutting dies 71.

Associated with each of the tubular anvil members 81 is a plunger 90. These plungers 90 are all supported at their upper ends by means of a cross-head 91 which is in the form of an inverted channel. This crosshead extends transversely between the posts 77 and is mounted for vertical movement, as will appear below. Each plunger 90 has its upper end yieldingly mounted in the crosshead 91, as shown best in Figure 4. For this purpose, the upper end of each plunger is reduced and is mounted for free vertical movement in an opening in the crosshead, the nut 92 on the upper end of each plunger preventing it from dropping through the opening in the crosshead. Between the shoulder 93 on each plunger and the crosshead 91 a compression spring 94 is provided in surrounding relationship to the plunger and normally urges the plunger downwardly.

The lower end of each plunger 90 is provided with an enlarged guide portion 95 which snugly fits in the cooperating tubular anvil member 81 and is free to slide therein. The extreme lower end of each plunger 90 is provided with a stripping head 97. This stripping head is of triangular shape, as shown best in Figure 12, to prevent jamming of the slugs in the circular cutting dies 71, as will later appear. It will be apparent that in the stripping action, the plunger head 97 will be moved downwardly from within the anvil member 81 and into and through the cooperating cutting die 71.

The crosshead 91 is provided with a plurality of upstanding pins 98 rigidly secured thereto intermediate the ends thereof and which are connected to a plate 99 (Figure 4) that is rigidly carried on the lower end of a piston rod 101 of a cylinder and piston unit 100. This cylinder and piston unit 100 includes the cylinder 102 and the piston 103 which carries the rod 101. The cylinder 102 has its upper end rigidly suspended from the channel support 87 by means of depending pins 104 which support a transversely extending plate 105 to which the cylinder 102 is attached. It will be noted from Figures 2, 3 and 4 that the cylinder 102 is disposed between the vertical movable actuating rods 83 which actuate the anvil block 66 and that these rods extend up through plate 105. Also, it will be noted that the transverse plate 105, for supporting the cylinder 102, is spaced sufficiently below the support 87 to permit the required downward movement of the bracket 84 when the anvil block 66 is moved downwardly. When the piston 103 is moved downwardly into cylinder 102, the crosshead 91 is moved downwardly which forces all the plungers 90 downwardly. The plungers are guided in their vertical movement by guide collars 106 (Figure 2) carried by brackets secured to the top surface of the anvil block 66 as shown best in Figure 2.

Figure 14:
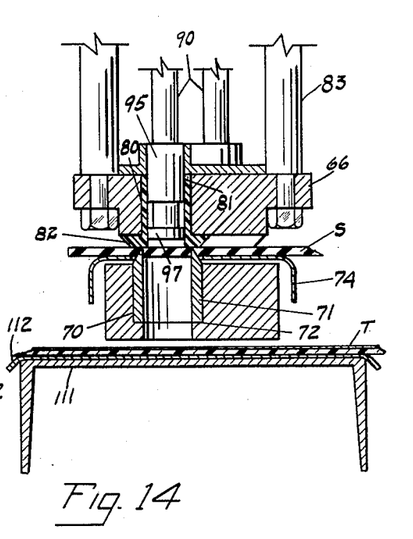
Figure 15:
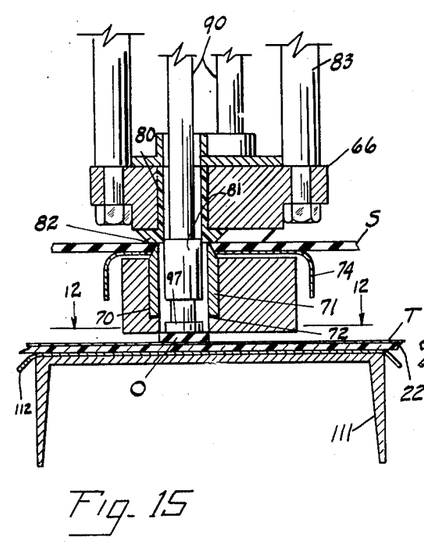
Figure 16:
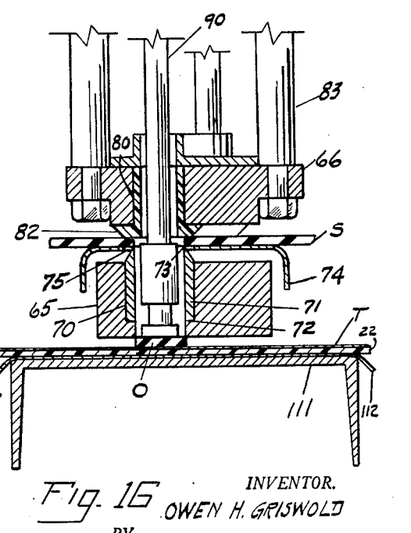

Assuming that the strip of stock S is properly located between the relatively movable cutter members 65 and 66 as shown in Figures 4 and 13 to 16, the slug-forming unit will function as follows: The initial position of the movable anvil block 66 is shown in Figure 4. If the anvil block 66 is now moved downwardly, by downward movement of the piston 88, the stock S is engaged by the flanges 82 of the anvils 81 which will force the stock against the upper cutting edges 73 of the cutting dies 71 as shown in Figure 13. Continued downward movement of member 66 will move anvil flanges 82 towards cutting edges 73 compressing the stock therebetween and cutting out the slugs O from the stock and forcing them into the upper ends of the cutting dies 71, it being understood that the stripping hood 74 will also move downwardly. If the crosshead 91 is now moved downwardly towards block 66, by downward movement of piston 103, the plungers 90 will move downwardly forcing the heads 97 thereof downwardly. This forces the slugs into the upper ends of the cutting dies 71, as shown in Figure 14. Continued downward movement of the crosshead 91 and the plungers 90 will result in the plunger heads moving on downwardly through the dies 71, as shown in Figure 15, forcing the slugs completely through the dies and depositing them on a transfer sheet T which is under the slug-forming unit 23 at this time on the conveyor belt 22. At this time the plunger 90 can yield upwardly against the action of springs 94. The lowermost position of block 66 is determined, as previously indicated, by stop collars 78a (Figure 3). If the anvil block 66 is now moved upwardly by upward movement of piston 88 (Figure 16) the anvils 81 will be raised and the hood 74 will be raised thereby stripping the strip S from the upper ends of dies 71. If the crosshead 91 is now moved upwardly, by upward movement of piston 103, the plunger heads 97 are withdrawn from the cutting dies 71 upwardly into anvils 81 to the position shown in Figure 13 and the unit 23 will again be in such condition so that a new section of the strip of stock S can be fed into position for the next slug-forming operation. Thus, the slugs O are cut from the stock S, are stripped from dies 71 and are deposited on the transfer sheet T, and finally the strip of stock S is stripped from the upper ends of the dies if it tends to adhere thereto.

Figure 12:
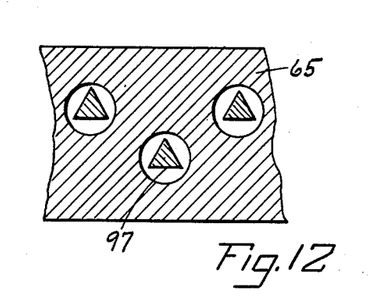
Figure 12 is a cross-sectional view taken along line 12—12 of Figure 15 through some of the stripping plungers and associated cutting members showing their relative cross-sectional shapes.

As indicated above and as shown in Figure 12, the head 97 of each plunger is of triangular shape while the cooperating die 71, from which the slug O is to be stripped, is circular. The relative cross-sectional shapes of these members prevents jamming of the slugs in the dies 71. During downward movement of each plunger head 97, the slug O is caused to bear on the periphery of the bore of the cutter die 71 at three equidistant points and to be relieved of pressure against the bore between these points. This is accomplished because the rubber slug O bends upwardly along each of the sides of the triangular plunger head 97 as it passes through the cutter die. The uncured rubber stock S which is used in forming the slugs O tends to adhere to the cutter die bore and will upset and by-pass the plunger head 97 if a round head is used. Therefore, I use a triangularly shaped head as shown. As pointed out above, a compression type of cutter is used and is necessary rather than a shear type because of the adhesive tendencies of the crude rubber. The plunger head 97 must be considerably smaller than the bore of the cutting die 71, as shown, and it is preferred that the anvil member 81 be of some non-metallic material which has the properties of "nylon" to prevent undue wearing of the cutting edge 73 of the cutting die. The material shown is illustrated as a plastic, it being understood that the sleeve is fabricated from homogeneous non-metallic material such as "nylon."

Different units 23 can be substituted for the one shown. Various units may be provided for producing slugs of various sizes and shapes, it being understood that in each unit the shapes and sizes of the cutting dies 71, the anvils 81 and the cooperating plungers 90 will vary. To substitute a different unit 23, it is merely necessary to remove the two bolts 69, substitute the new unit 23 and replace bolts 69. As will later appear, some air lines and electric lines will also be disconnected and reconnected in case of substitution of units 23 but provision is also made for this. The leveling and gauge plates 67 can be changed to change the level of unit 23 relative to that of belt 22.

As previously indicated, the transfer sheet T will contain a series of staggered transverse rows of marks M. One of these marks is to be transferred to each slug eventually and for this reason it is desired to deposit each slug formed by unit 23 on one of these marks. The marks are spaced and staggered in the same manner as the cutting dies 71 which form the slugs. As previously indicated, the staggered arrangement of rows is provided so that maximum yield of slugs from the strip S of stock is obtained. The transfer sheet T is preferably of translucent paper or cloth and for timing and indexing purposes it is provided with transverse indexing marks or bands I at one edge thereof. The indexing marks I are printed on the translucent sheet T with opaque ink on the top surface where the trademarks are printed. With this arrangement of the indexing marks I, the sheet can pass into association with a photoelectric relay device 110 (Figures 3 to 6) for setting up operation of the unit 23. However, the transfer sheet need not be translucent because the photorelay unit 110 is controlled by reflected light from the transfer sheet. The indexing marks can be printed on its lower surface if sheet T is opaque.

The transfer sheet T, as shown in Figure 2, will be placed on the belt 22 at the forward side of the machine and under the roll of waste material on the mandrel 36. The moving belt 22 will carry the transfer sheet under the die block 65 of the unit 23. It will be noted from Figure 6 that directly beneath the die block 65 is a heavy inverted channel 111 for receiving the thrust exerted by the plungers 90 when they force the slugs from the cutting dies 71 onto the transfer sheet T, it being understood that the belt 22 will receive considerable pressure from the plungers. However, this pressure will be taken by the member 111 which will be directly below the top portion of the endless belt 22. To reduce friction and to prevent undue wear on the lower surface of the belt 22, the top surface of member 111 is covered with a thin, smooth guard plate 112 which extends over the sharp forward and rearward corner edges of the member 111.

Figure 5:
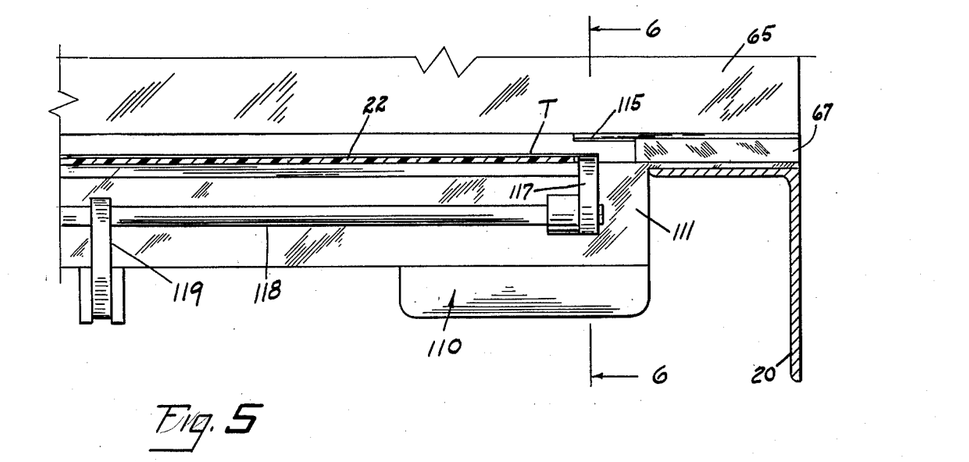
Figure 5 is an enlarged detail in transverse section showing the transfer sheet clamping unit.

The photoelectric relay unit 110 has associated with it a light source 113 which is disposed directly below member 111. The light from this source shines upwardly through a slot 114 in the one end of member 111 and through an aligning slot in the guard member 112. These slots are disposed just outside of the one edge of the belt 22 and the light from the source 113 will shine on a backing plate 115 attached to the lower surface of one of the plates 67 which extends inwardly over the adjacent edge of the belt 22, as shown in Figure 5. The upper plate 67 at the other side of the machine will also extend inwardly but will not have backing 115 thereon. This backing plate 115 is preferably formed of a white phenolic resin which has approximately the same light-reflecting properties as the transfer sheet itself. The transfer sheet T is wider than the belt 22 and extends beyond its side edges. The light beam will shine through the edge of the transfer sheet, upon which the indexing marks I are printed, and will be interrupted by such marks. Because the backing plate 115 is of substantially the same reflecting property as the transfer sheet, the photo-relay unit 110 will be prevented from operating as the rear or trailing edge of the sheet T passes through the light beam. In other words, only the indexing marks I will interrupt the light beam from the source 113.

Figure 6:
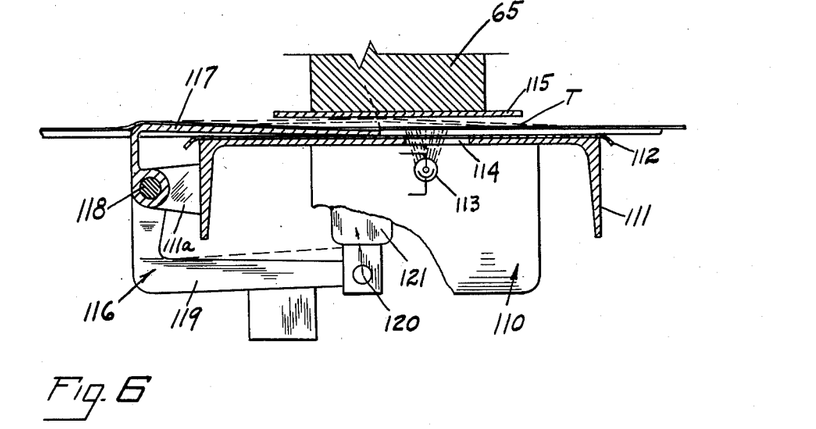
Figure 6 is a vertical sectional view taken along line 6—6 of Figure 5.

The relay unit 110 is adapted to actuate a transfer sheet clamping unit 116 which is shown best in Figures 3, 4, 5 and 6. This unit comprises the clamping fingers 117 which are substantially horizontally disposed just outside each side edge of the belt 22 as shown best in Figure 3. Each finger 117 is keyed on a shaft 118 rockably mounted at the forward side of the channel member 111 in lugs 111a. The fingers 117 extend rearwardly to points beyond the forward edge of die block 65, as shown in Figure 6. The finger 117 at that side where the photoelectric relay unit 110 is disposed is provided with a rigid arm 119 extending downwardly and rearwardly from the shaft 118. This arm 119 is pivotally connected at 120 to the core of a solenoid 121 which functions with the unit 110. When the solenoid 121 is energized, the arm 119 is pulled upwardly which will rock the shaft 118 and swing the two fingers 117 upwardly causing them to lift the side edges of the transfer sheet T slightly and clamp said edges against the lower surfaces of the two inwardly extending plates 67. Thus, the transfer sheet will be clamped in position beneath the die block 65 and the belt 22 can continue to move on forwardly beneath the transfer sheet. Clamping of the sheet T in position ensures that the marks M on the transfer sheet will be positively and accurately located below the member 65 so that each slug formed during the subsequent slug-forming operation will be deposited on one of the marks M.

As previously indicated, the machine is controlled by a combined fluid and electric control system. This system is illustrated diagrammatically in Figure 17.

Figure 17:
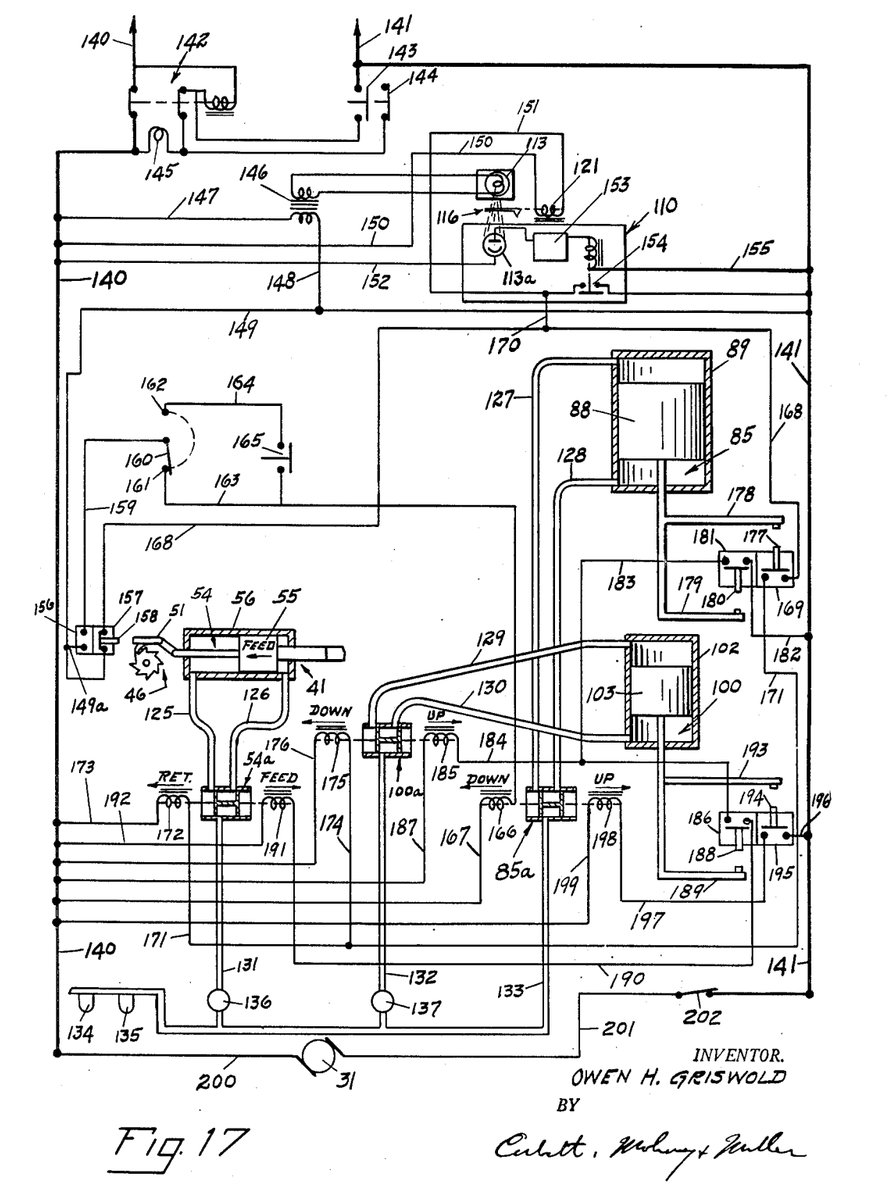
Figure 17 is a diagrammatic view showing the electrical circuit and fluid circuit of the machine.

The fluid system is shown as a pneumatic system and includes the stock-feeding cylinder and piston unit 54, the anvil moving cylinder and piston unit 85 and the plunger moving cylinder and piston unit 100. The unit 54 is controlled by a valve 54a, the unit 85 by a valve 85a, and the unit 100 by a valve 100a. These valves are of the usual type and are shown diagrammatically.

Air lines 125 and 126 lead from the opposed ends of the valve 54a to the corresponding ends of the cylinder 56 of unit 54; line 127 and 128 connect the corresponding ends of the valve 85a with the cylinder 89 of unit 85; and lines 129 and 130 connect the ends of valve 100a to the corresponding ends of the cylinder 102 of unit 103. An air supply line 131 connects to the valve 54a intermediate its ends and similarly the supply lines 132 and 133 connect to the valves 100a and 85a, respectively. The line 133 is the main air supply line leading from a suitable source and preferably has connected therein a filter 134 and a lubricator 135. The lines 131 and 132 branch from the main line 133 and are preferably controlled by pressure-reducing valve and gauge units 136 and 137, respectively. In one position of each of the valves 54a, 85a and 100a, air will be supplied to one end of the cylinder which it controls and in the other position of the valve air will be supplied to the opposite end of the cylinder which it controls, it being understood that in each instance the opposed end of the cylinder will be vented by the valve in the usual manner.

The electric system includes the main drive motor 31, the photoelectric relay unit 110, the light source 113 and the solenoid 121 previously mentioned. As shown in Figure 17, this circuit includes the main lines 140 and 141 which connect to a suitable source of power. A suitable starting relay 142 is connected between the lines 140 and 141. A normally open push-button 143 is provided at a starting station on the machine and is connected to the starting relay while a normally closed push-button 144 is provided at a stop station on the machine and is connected to the starting relay. A pilot light 145 is connected in the starting relay circuit to indicate when the machine has been started. A transformer 146 is provided to supply the light source 113 with suitable voltage. The primary of this transformer is connected by line 147 to the main line 140 and by line 148 to a line 149 which connect with the main line 141. The secondary of this transformer is connected in a line 150 in which the light source 113 is connected. The coil of the solenoid 121 of the transfer sheet clamping unit 116 has one side connected to the main line 140 by a line 150 and its opposite side connected by a line 151 to the main line 141. The photoelectric unit 110 is a special type of unit which operates on the rate of change of light and not on the quantity of light. The unit 110 includes the photocell 113a which is connected to the line 140 by a line 152 and which is also connected to a timing device 153. This timing device, which forms a part of the unit 110, opens the relay switch 154 a fraction of a second after the circuit is made at this switch. The timing device 153 is connected to the coil of relay switch 154 and the coil is connected to the main line 141 by a line 155. The switch 154 controls the line 151 which connects to the coil of solenoid 121. The line 149 connects to the main line 141 and to one side of a normally closed feed switch 157, and also connects to one side of a normally open feed switch 156 by a branch 149a. The switches 156 and 157 are controlled by the same plunger 158. The switches 156 and 157 are disposed adjacent the stock-feed unit 41 and the push-button 158 is engaged by a finger 52a (Figure 7), carried by a link 52, at the end of the feed stroke of the piston 55 of the cylinder and piston unit 54. The opposite side of switch 156 is connected by line 159 to switch arm 160 which may be swung between contact points 161 and 162. As will later appear, when arm 160 is in contact with point 161, the machine will be set for automatic operation while when it is in contact with point 162, the machine is set for hand operation. The point 161 is connected to a line 163 and the point 162 is connected by a line 164 through a normally open push-button jog switch 165 to line 163. The line 163 connects with one side of the coil of the solenoid 166 which controls the valve 85a to impart downward movement to the piston 88 of the anvil-moving cylinder and piston unit 85. The other side of this coil of solenoid 166 is connected by line 167 to the main line 140. A line 168 leads from the other side of the feed switch 157 and connects to one side of a normally open switch 169, it being noted that the line 168 is also connected to line 151 by a branch 170. The opposite side of the switch 169 is connected by line 171 to one side of the coil of a solenoid 172 which controls valve 54a to impart return movement to piston 55 of the stock-feeding cylinder and piston unit 54. The opposite side of this coil or solenoid 172 is connected by line 173 to the main line 140. Branching from the line 171 is a line 174 which connects to one side of the coil of the solenoid 175 which controls valve 100a to actuate plunger-moving cylinder and piston unit 100 to cause downward movement of the piston 103 thereof. The opposite side of this coil of solenoid 175 is connected by line 176 to the main line 140. The normally open switch 169 is actuated by a plunger 177 which is engaged by an arm 178, mechanically connected to the anvil-moving piston 88, when such piston is in its lowermost position. This piston 88 also has an arm 179 mechanically connected thereto which engages a plunger 180 when the piston 88 reaches its uppermost position. This plunger 180 controls a normally open switch 181. One side of this switch 181 is connected by a line 182 to the main line 141 while the opposite side is connected by a line 183 to a line 184. This line 184 connects one side of the coil of solenoid 185 to one side of a switch 186 while the other side of this coil is connected by line 187 to the main line 140. The solenoid 185 actuates valve 100a to move upwardly the piston 103 of the stripping plunger-moving cylinder and piston unit 100. The switch 186 is normally open but is actuated by a plunger 188 which is engaged by an arm 189, mechanically connected to piston 103, when the piston reaches its uppermost position. The opposite side of this switch 186 is connected by the line 190 to one side of the coil of the solenoid 191 which controls valve 54a to produce the feed stroke of the piston 55 of the cylinder and piston unit 54. The opposite side of the coil of solenoid 191 is connected by line 192 to the main line 140. The stripping plunger-moving piston 103 also has mechanically connected to it an arm 193 which engages a plunger 194 of a normally open switch 195, the plunger 194 being engaged when piston 103 reaches its lowermost position. One side of the switch 195 is connected by a line 196 to the main line 141. The other side of the switch is connected by line 197 to the coil of a solenoid 198 which actuates valve 85a to control the anvil-moving cylinder and piston unit 85 so as to cause piston 88 thereof to move upwardly. The other side of the coil of solenoid 198 is connected by the line 199 to the main line 140. One side of the motor 31 is connected by line 200 to the main line 140 while the other side is connected by line 201 to the main line 141. A motor control switch 202 is provided in the line 201 and is normally closed during operation of the machine.

As indicated above, the normally open switches 169 and 181 are actuated by movement of the piston 88 while the normally open switches 186 and 195 are actuated by movement of the piston 103. All of these switches are supported on the unit 23 of the machine by means of a bracket 205 which suspends them from the channel support 87. The mechanical means for actuating these switches is illustrated best in Figures 3 and 8 to 11, inclusive. As previously indicated, the arms 178 and 179, which actuate switches 169 and 181, respectively, are connected for movement with the piston 88 of unit 85. The arms 178 and 179 are carried at different levels on a vertically disposed rod 206 which is rigidly carried by a horizontal arm 206a that is fastened to the bracket 84 which is attached to the piston rod 86. The arm 178 is disposed above the switch 169 and is provided with an adjustable button 207 that is directly above the plunger 177 of the switch. The arm 179 is disposed below the switch 181 and is provided with an adjustable button 208 which engages the plunger 180 of such switch. The arms 189 and 193, which actuate the switches 186 and 195, respectively, are carried at different levels on a rod 209 which is secured to the crosshead 91 and extends upwardly therefrom. The arm 193 is provided with an adjustable button 210 which is directly over the plunger 194 of switch 195 while the arm 189 carries an adjustable button 211 which is directly under the plunger 188 of the switch 186.

Figure 9:
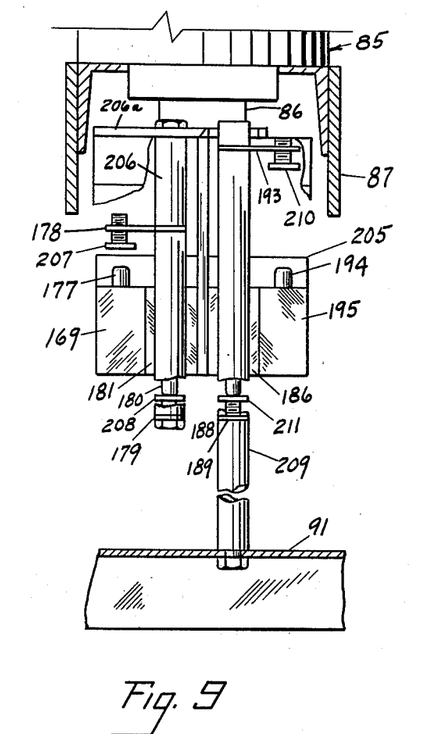
Figure 9 is an enlarged detail, mainly in side elevation, showing the switch-actuating arms in one position.
Figure 10:
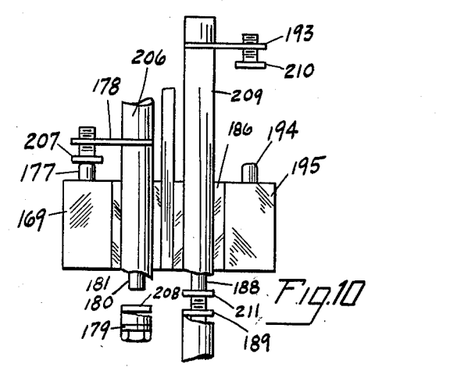
Figures 10 and 11 are similar views showing the actuating arms in two subsequent successive positions.
Figure 11:
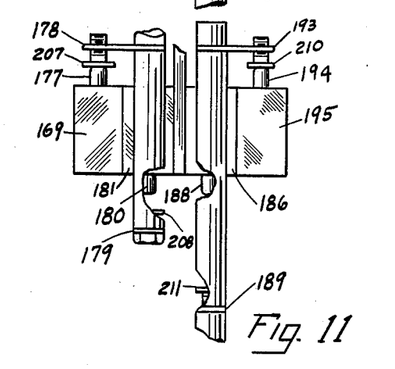

With the pistons 88 and 103 in their uppermost positions, the various switch-actuating arms are in the positions shown in Figure 9 to close switches 181 and 186 and to permit the switches 169 and 195 to remain open. When the anvil piston 88 moves downwardly, the arm 179 moves downwardly and permits switch 181 to open while the arm 178 moves downwardly and closes switch 169, as shown in Figure 10. When the plunger piston 103 moves downwardly subsequently, the arm 189 moves downwardly and opens switch 186 while the arm 193 moves downwardly and closes switch 195, as shown in Figure 11. When the plunger piston 103 next moves upwardly, it permits opening of switch 195 and causes closing of switch 186. Upward movement of the anvil piston 88 then causes opening of switch 169 and then closing of switch 181. Thus, the four control switches 169, 181, 186 and 195 are operative at proper intervals during the operation of the slug-forming unit 23. The feed switches 156 and 157, associated with stock-feeding unit 41, are actuated at proper intervals in timed relationship to the other four switches by means of the finger 52a.

As previously indicated, the head or unit 23 can be removed merely by removing the two bolts 69. The air lines 127, 128, 129 and 130 will be disconnected at the couplings 127a, 128a, 129a and 130a, respectively. The electric lines running to the switches 169, 181, 186 and 195 on the unit 23 will be in a cable 214 which will be provided with a disconnect plug 215.

In describing the operation of the machine with particular reference to Figure 17, the following conditions will be assumed:

1. The selector switch 160 is set for automatic operation.
2. The cutter anvil piston 88 is at its uppermost position.
3. The plunger piston 103 is at its uppermost position.
4. The feed piston 55 is at the extreme end of its feed stroke.

Under these conditions the positions of the various control switches will be as follows:

Normally open feed switch 156 will be closed.
Normally closed feed switch 157 will be open.
Normally open cutter anvil switch 181 will be closed.
Normally open cutter anvil switch 169 will be open.
Normally open plunger switch 186 will be closed.
Normally open plunger switch 195 will be open.

Assuming also that the machine has been started by proper actuation of starting button 143 and starting relay 142 and by operation of switch 202 which starts the conveyor 21, if a sheet T of the transfer paper is placed on the belt 22 at the forward side of the machine, it will be carried beneath the unit 23 by the moving belt. The sheet will pass through the photoelectric relay scanning head light beam of unit 110, which is reflected back to the photocell 113a by the sheet and the backing plate 115 (Figure 5), until an index mark I thereon interrupts the beam which will actuate the sheet-clamping unit 116 to act as shown in Figures 5 and 6 to clamp the edges of the sheet T so as to hold the sheet in fixed position relative to unit 23 while the belt 22 continues to move on beneath it. The sheet T will be held by the action of said relay and the holding solenoid 121 for the period of time delay of the relay unit 110 provided by time delay unit 153. The down cutter anvil solenoid 166 is energized when the starting relay 142 is closed, and is not affected by photorelay switch 154, through the closed feed switch 156, the circuit being from main line 141, through line 149, line 149a, switch 156, line 159, switch 160, line 163, the coil of solenoid 166, line 167, to main line 140. This actuates valve 85a and causes piston 88 of unit 85 to move downwardly. This moves the anvil block 66 downwardly cutting the slugs O from the sheet S of material which has been previously fed into proper position between the anvil block 66 and the cutter die block 65. Downward movement of piston 88 causes the arm 178 to close switch 169 and moves arm 179 away from switch 181 to permit it to open. Closing the switch 169 energizes the down plunger solenoid 175 through the following circuit: from main line 140 through line 176, the coil of solenoid 175, line 174, line 171, switch 169, line 168, line 170, and through line 151 and photoelectric relay switch 154 to main line 141. The same circuit also energizes the return feed valve solenoid 172 through line 171, the coil of solenoid 172 and line 173 which connects to line 140. Energizing the solenoid 175 actuates valve 100a to move piston 103 of unit 100 downwardly thereby moving the plungers 90 downwardly through the cutting dies 71 and stripping the slugs O therefrom. As previously indicated, the plungers will deposit the slugs O on the marks M of the transfer sheet and will press the sheet against the belt 22, this pressure causing the belt to stop for a certain period sufficient to permit the controls to function to move the plungers upwardly as will be explained below. Energizing the solenoid 172 actuates valve 54a to move the piston 55 of unit 54 to the right (Figure 17) where it is in position for another feeding stroke. Movement of this piston 55 to the right opens the switch 156 and closes the switch 157. This switch 157 closes a circuit parallel to the photoelectric relay circuit thereby maintaining this circuit when the time delay unit 153 opens the photoelectric relay circuit. This parallel circuit is from switch 169, through line 168, switch 157, line 149, to line 141. Thus, reliable high speed operation is obtained independent of the time cycle since the photorelay switch 154 opens after a time delay but the circuit is maintained by means of the normally closed feed switch (157) circuit which parallels the photorelay circuit. The open feed switch 156 breaks the circuit to the down anvil cutter solenoid 166 until the completion of the feed stroke of piston 55. Thus, downward movement of the anvil is prevented until a new supply of stock is fed under the anvil block 66. As the plunger-moving piston 103, and, therefore, the plungers 90, reach their lowermost positions, the switch 195 is closed by downwardly moving arm 193 completing a circuit to the up cutter anvil solenoid 198 from main line 141, line 196, switch 195, line 197, the coil of solenoid 198 and through line 199 to main line 140. This actuates valve 85a to move the piston 83 of the anvil moving unit 85 upwardly and arm 178 now permits switch 169 to open and arm 179 now closes switch 181. Closing the switch 181 energizes the up plunger solenoid 185 by means of line 182 from main line 141, switch 181, line 183, line 184, the coil of solenoid 185, and line 187 to line 140. Energizing the up plunger solenoid 185 actuates valve 100a to move the plunger piston 103 upwardly. This causes upward movement of arms 189 and 193 which closes switch 186 and opens switch 195. Closing switch 186 energizes the feed solenoid 191 through the cutter anvil switches 181 and the plunger switch 186. This is done by a series circuit from main line 140, the coil of feed solenoid 191, line 190, switch 186, line 184, line 183, switch 181, line 182, to main line 141. This series circuit is only energized, however, when anvil cutter switch 181 is closed which is after the piston 83 reaches its uppermost position. This series circuit prevents the material being fed by the feed stroke of piston 55 of unit 54 until both the anvil cutter piston 83 and the plunger piston 103 are in their uppermost positions. Thus, the cutter anvils 80 and the plungers 90 will be clear of the feed path of the strip of stock which is fed when solenoid 191 is energized to actuate valve 54a so as to cause piston 55 to move in the feeding direction to actuate stock-feeding unit 41, presenting a new supply of stock below anvil block 66. At the end of the feed stroke of the piston 55, the switch 156 is closed which energizes down cutter anvil solenoid 166. This causes downward movement of the anvils 81 which cut out slugs O from strip S and load them into the mouth of cutting dies 71 preparatory to their being stripped onto the transfer sheet T when the plungers 90 are triggered by photorelay unit 110, the switch 157 also being opened and this breaking the circuit through lines 168, 170, and 151 to the transfer sheet clamping solenoid 121. This releases the transfer sheet so that it can move on with the moving belt 22 until its next index mark M moves into association with photorelay unit 110 and will trigger the photoelectric circuit so as to again set up the machine for the next operating cycle which will be initiated automatically. At this time the transfer sheet T will again be clamped by unit 116 with the next two rows of marks M in position to receive the next two rows of slugs O to be formed in the next slug-forming operation.

The selector switch 160 can be set for hand operation by moving it into contact with point 162. Then, if the jog button 165 is pressed within the time delay period created by unit 153 of the photoelectric unit 110, the cycle of operation of the machine will be started. Solenoid 166 is energized when the jog button 165 is closed.

To stop the machine it is merely necessary to push button 143.

When the transfer sheet is completely filled with slugs and the sheet passes rearwardly from the unit 23, the sheet may be transferred to another machine where further operations are performed in forming the patches.

It will be apparent from the above that I have provided a machine which will effectively cut slugs from a strip of stock and properly position them on transfer sheets with marks printed thereon for transfer to the slugs. The machine is capable of handling the sticky, heavy, uncured rubber stock which is very difficult to handle. In fact the machine uses the adhesive nature of the material to advantage in the operation and control of the machine. This is especially true in the feeding of the stock to the slug-forming unit and in the pressing of the transfer sheet against the conveyor belt by the plungers to interrupt movement of such belt. The machine, when so set, is automatic in operation and the timing and indexing of the machine is determined by the particular transfer sheet being used. This makes the machine readily adaptable to the forming of different sizes and shapes of slugs. The stock is in roll form when fed into the machine and the waste or scrap material is saved in roll form. Furthermore, the cutting dies and anvils are so arranged that maximum use of the area of the strip of stock is obtained.

Various other advantages will be apparent.

Having thus described my invention, what I claim is:

1. A machine for forming slugs or the like from a strip of material and arranging them in predetermined order on a receiver sheet having indexing marks thereon which comprises a slug-forming unit, a conveyor for conducting the receiver sheet into association with said unit, means for feeding the strip of material into association with said unit, and control means actuated by movement of the sheet on said conveyor into association with said unit for controlling operation of said unit and said material-feeding means, said control means including a photoelectric relay unit actuated by said indexing marks as the sheet is moved into association therewith by the conveyor, means for normally driving the conveyor continuously, said driving means including a yieldable driving unit for interrupting movement of said conveyor for a limited period while the slugs are being arranged thereon, clamping means associated with said unit for clamping the receiver sheet in fixed position relative to said unit, said clamping means also being actuated by said control means, said conveyor including a belt, said receiver sheet being wider than the belt and extending beyond each edge thereof with the indexing marks on one of the extending edges, said photoelectric relay unit including a light source giving a beam interrupted by said indexing marks.

2. A machine according to claim 1 wherein reflecting means is provided for reflecting the beam to the photocell of said photoelectric unit, said reflecting means having substantially the same light reflective qualities as said receiver sheet.

3. A machine according to claim 2 wherein said clamping means includes clamping members which engage the extending edges of said sheet and lift it slightly from the belt to permit continued movement of the belt without the sheet.

4. A machine for forming slugs or the like from a strip of relatively heavy sticky stock and depositing them on a transfer sheet having marks upon which each slug is to be deposited, which comprises a frame, a horizontally disposed conveyor on said frame and including an endless belt, driving means for normally driving said belt continuously, a slug-forming unit supported by said frame and disposed transversely above the conveyor belt, said slug-forming unit including relatively movable cutter members between which the strip of stock is fed, means for feeding the stock intermittently into said unit, said transfer sheet being carried by the conveyor into said unit, and control means actuated by movement of the transfer sheet into said unit for controlling operation of said unit and said stock-feeding means.

5. A machine according to claim 4 wherein the cutter members of said slug-forming unit include a stationary die block which will be below the strip of stock and a downwardly movable anvil block which will be above the stock, said die block having a series of dies, said transfer sheet having the marks thereon arranged in the same manner as the dies in said block, said conveyor belt extending below said die block to carry the transfer sheet therebeneath.

6. A machine according to claim 5 wherein said slug-forming unit includes vertically movable plungers for stripping the slugs from the dies and depositing them on said transfer sheet and wherein said belt-driving means includes a yieldable clutch which permits said belt to stop for a limited period while the slugs are being deposited on said transfer sheet by said plungers.

7. A machine for forming slugs or the like from a strip of relatively heavy sticky stock and depositing them on a transfer sheet having marks upon which each slug is to be deposited, which comprises a frame, a horizontally disposed conveyor on said frame and including an endless belt, driving means for normally driving said belt continuously, a slug-forming unit supported by said frame and disposed transversely above the conveyor belt, said slug-forming unit including relatively movable cutter members between which the strip of stock is fed, means for feeding the stock intermittently into said unit, said cutter members including a stationary die block which will be below the strip of stock and a downwardly movable anvil block which will be above the stock, said die block having a series of dies, said transfer sheet being carried by the conveyor into said unit and having the marks thereon arranged in the same manner as the dies in said block, said conveyor belt extending below said die block to carry the transfer sheet therebeneath, control means actuated by movement of the transfer sheet into said unit for controlling operation of said unit and said stock-feeding means, said slug-forming unit including vertically movable plungers for stripping the slugs from the dies and depositing them on said transfer sheet, said belt-driving means including a yieldable clutch which permits said belt to stop for a limited period while the slugs are being deposited on said transfer sheet by said plungers, said belt being of less width than said transfer sheet so that the sheet extends beyond both side edges of the belt, and a clamping unit for clamping said sheet in fixed position beneath the die-block of said slug-forming unit, said clamping unit including clamping members which engage the extending edges of said sheet and lift it slightly from the belt to permit continued movement of the belt underneath the sheet, said clamping unit being also controlled by said control means.

8. A machine according to claim 7 wherein the transfer sheet has indexing marks on one of the extending edges thereof, said control means including a photoelectric relay unit having a light source which projects a beam onto said edge of said sheet and which will be broken by said indexing marks to actuate said photoelectric unit.

9. A machine according to claim 8 wherein reflecting means is provided for reflecting the beam to the photocell of said photoelectric unit, said reflecting means having substantially the same light reflective qualities as said transfer sheet.

10. A machine according to claim 9 wherein said slug-forming unit includes a fluid-actuated cylinder and piston unit for moving the anvil block vertically, an independent fluid-actuated cylinder and piston unit for moving said stripping plungers relative to said anvil block, said control means including electromagnetic valves for controlling said cylinder and piston units.

11. A machine according to claim 10 wherein the stock-feeding means includes a driven roller disposed beyond the slug-forming unit, an overriding clutch intermittently actuated to drive said roller, and a fluid-actuated cylinder and piston unit for actuating said clutch, said control means including an electromagnetic valve for controlling said cylinder and piston unit.

12. A machine according to claim 11 wherein said fluid-actuated cylinder and piston unit has adjustable stop means for positively limiting the feeding stroke of the piston of said unit.

13. A machine according to claim 12 wherein said electromagnetic valves are controlled by switches associated with said cylinder and piston units and mechanically actuated by movement of the pistons of said units.

14. A machine according to claim 13 wherein all of said switches are connected operatively with said photoelectric relay unit and wherein said photoelectric relay unit includes a time delay means which reopens said relay a definite period after actuation thereof.

15. A machine according to claim 11 wherein said control means comprises an electric circuit in which said photoelectric relay unit is connected, said clamping unit including a solenoid connected in the circuit and controlled by said photoelectric relay unit, said photoelectric relay unit including a time delay means for controlling the relay thereof, an electromagnetic valve for controlling said cylinder and piston unit which moves said anvil block, an electromagnetic valve for controlling said cylinder and piston unit which moves said stripping plungers, a pair of control switches connected in said circuit and actuated by movement of the piston of said stock-feeding unit, a pair of control switches connected in said circuit and actuated by movement of the piston of said anvil block moving unit, and a pair of control switches connected in said circuit and actuated by movement of the piston of said plunger moving unit.

16. A machine according to claim 15 wherein said electromagnetic valve for controlling the stock-feed cylinder and piston unit comprises a feed solenoid and a return solenoid connected in said circuit, said electromagnetic valve for controlling the anvil block moving cylinder and piston unit comprising an up solenoid and a down solenoid connected in said circuit; and said electromagnetic valve for controlling the plunger moving cylinder and piston unit comprising an up solenoid and a down solenoid connected in said circuit.

17. A machine according to claim 16 wherein the two switches actuated by the piston of the stock-feeding unit comprise a normally open feed switch and a normally closed feed switch, the two switches actuated by the piston of said anvil block moving unit are normally open, and the two switches actuated by movement of the plunger moving piston are normally open.

18. A machine according to claim 17 wherein the clamping unit solenoid and the relay switch of the photoelectric relay unit are connected in series to opposite sides of the circuit; the photocell, the time delay means and the relay coil of the photoelectric relay unit are connected in series to the opposite sides of the circuit; the down anvil solenoid and the normally open feed switch are connected in series to opposite sides of the circuit, the normally open feed switch also being connected to said normally closed feed switch; the return solenoid of the feed piston valve, the switch actuated by downward movement of the anvil piston, and the normally closed feed switch being connected in series to opposite sides of the circuit; the feed solenoid of the feed piston valve, the switch actuated by upward movement of the plunger piston and the up plunger solenoid being connected in series to one side of the circuit and to the other side of the circuit by a connection through the switch actuated by upward movement of the anvil piston; the down plunger solenoid being connected to one side of the circuit at a point between the connections of the up plunger solenoid and the feed solenoid and being connected to the connection between the return feed solenoid and the switch actuated by downward movement of the anvil piston; and the up anvil solenoid and the switch actuated by downward movement of the plunger piston being connected in series to opposite sides of the circuit.

19. A machine according to claim 18 including a switch connected between said normally open feed switch and said down anvil solenoid for setting the circuit so that the machine will be automatic or hand operated, said switch including a push-button for hand operation.

References Cited in the file of this patent

UNITED STATES PATENTS

| Number | Name | Date |
| --- | --- | --- |
| 64,197 | Clark | Apr. 30, 1867 |
| 1,161,850 | Dixon | Nov. 30, 1915 |
| 1,859,785 | Messinger | May 24, 1932 |
| 2,047,221 | Pechy | July 14, 1936 |
| 2,155,578 | Anderson | Apr. 25, 1939 |
| 2,360,275 | Rau | Oct. 10, 1944 |
| 2,408,488 | Sorensen | Oct. 1, 1946 |